United States Patent [19]
Han

[11] Patent Number: 5,625,955
[45] Date of Patent: May 6, 1997

[54] TILT SENSOR

[75] Inventor: Bin Han, Kyungsangnam-do, Rep. of Korea

[73] Assignee: Hyundai Motor Company, Ulsan, Rep. of Korea

[21] Appl. No.: 449,002

[22] Filed: May 24, 1995

[30]     Foreign Application Priority Data

Jun. 17, 1994 [KR]  Rep. of Korea .................. 94-13710

[51] Int. Cl.⁶ ............................................. G01C 9/06
[52] U.S. Cl. .............................................. 33/366; 33/390
[58] Field of Search ................................... 33/366, 390

[56]                References Cited

U.S. PATENT DOCUMENTS

| | | | |
|---|---|---|---|
| 2,338,811 | 1/1944 | Hasbrook | 33/366 |
| 3,164,023 | 1/1965 | Holderer | 33/366 |
| 3,271,650 | 9/1966 | Riddle | 33/366 |
| 3,290,786 | 12/1966 | Parkin | 33/366 |
| 3,478,437 | 11/1969 | Cothran | 33/366 |
| 3,487,303 | 12/1969 | Remington | 33/366 |
| 4,603,484 | 8/1986 | Strothmann | 33/366 |

FOREIGN PATENT DOCUMENTS 2250600  10/1992  United Kingdom .............. 33/366

*Primary Examiner*—Thomas B. Will

[57]               ABSTRACT

The present invention discloses a tilt sensor including a container having a bubble on a surface of the conductive liquid as the conductive liquid is filled in the container, an electrode to provide a current to the conductive liquid in the container, and terminals to output the current provided from the electrode through the conductive liquid, thereby outputting a tilt sensing signal by the presence of an electric connection between the electrode and the terminals.

18 Claims, 3 Drawing Sheets

TILT SENSOR

BACKGROUND OF THE INVENTION

1. Field of the Invention

The present invention relates to a tilt sensor. More particularly, the present invention relates to a tilt sensor that can sense the movement of a bubble in response to a tilting direction and output a signal representative of the sensed tilting.

2. Description of Related Art

A conventional tilt sensor simply lets a user know the tilting direction and has a low sensitivity. Normally, the sensor resides in a circuit for converting a physical characteristic into an electrical signal in order to output a signal in response to the tilting direction.

SUMMARY OF THE INVENTION

It is an object of the present invention to provide a tilt sensor for converting a physical characteristic, such as the movement of a bubble in response to a tilting direction into an electrical signal which has a high sensitivity and outputting a representative signal.

To achieve the above and other objects, the present invention is directed to a tilt sensor, comprising:

a container having a bubble on the surface of a conductive liquid is filled in the container;

an electrode to provide a current to the conductive liquid in the container; and terminals to output the current provided from the electrode through the conductive liquid, thereby outputting a tilt sensing signal by the presence of an electric connection between the electrode and the terminals.

The tilt sensor according to the present invention is useful for all kinds of vehicles that passengers may ride in, particularly for the type of vehicles in which it is relatively difficult to perform tilt-sensing but in which such sensing is indispensable, such as like an airplane or a submarine.

BRIEF DESCRIPTION OF THE DRAWINGS

Further advantages and other objects of the present invention will be apparent in the following detailed description in connection with the accompanying drawings, in which.

DETAILED DESCRIPTION OF THE PREFERRED EMBODIMENTS

Figure 1A:
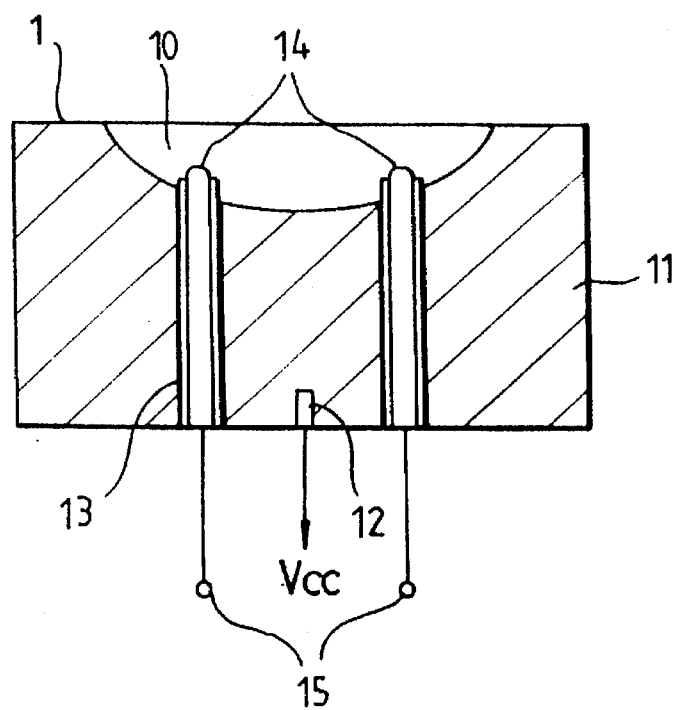
FIG. 1A through 1C show the operation of a tilt sensor according to a first preferred embodiment of the present invention.
Figure 1B:
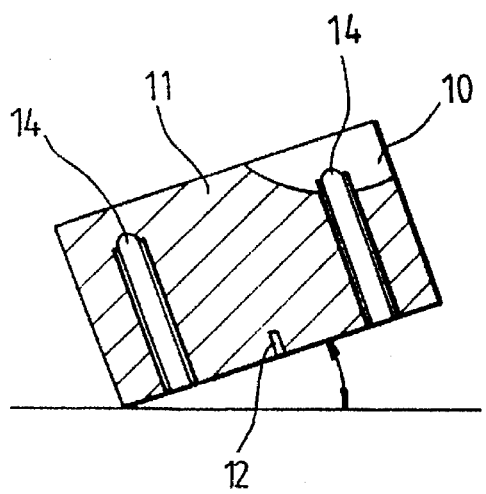
Figure 1C:
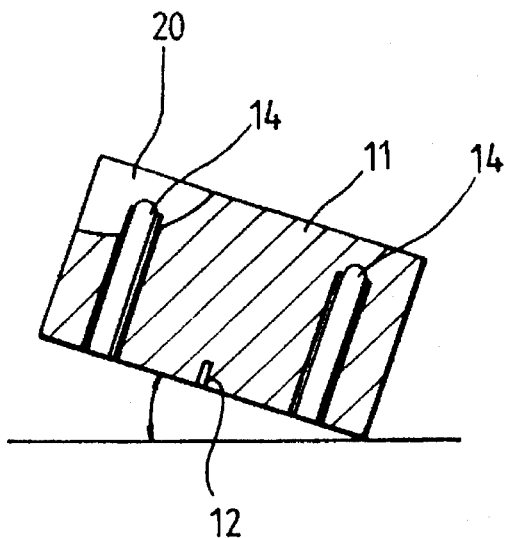
Figure 2A:
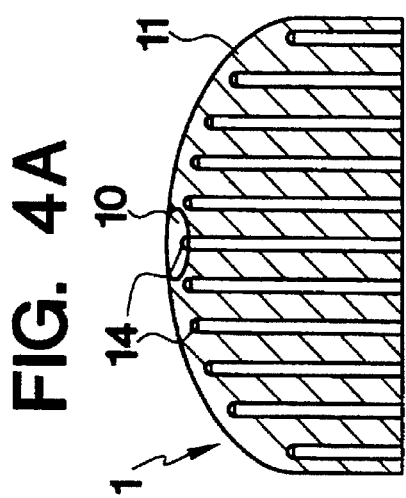
FIG. 2A shows a front view taken along line II—II and FIG. 2B shows an elevational view of a tilt sensor according to the first preferred embodiment of the present invention.
Figure 2B:
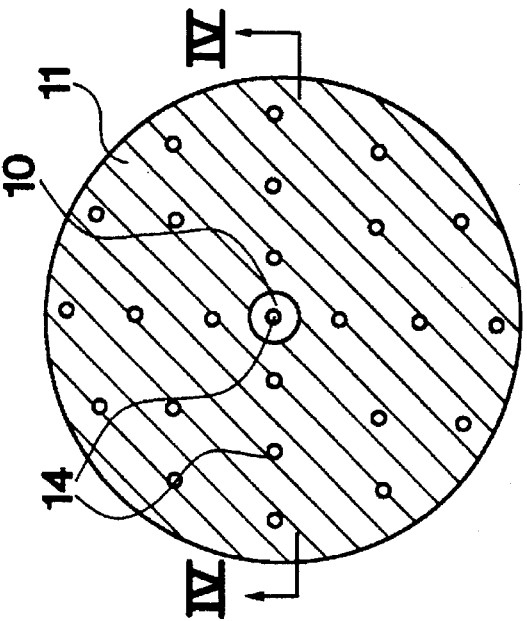

FIGS. 1A through 1C show the operation of a tilt sensor according to a first preferred embodiment of the present invention and FIG. 2A shows a front view, and FIG. 2B shows an elevational view of the tilt sensor according to the first preferred embodiment of the present invention.

Reference numerals appearing in FIGS. 1A through 6 designate the following:

- 1: a rectangular container filled with a conductive liquid having a bubble of a predetermined size;
- 10: a bubble moving in response to a tilting direction of the container;
- 11: the conductive liquid for providing a current path;
- 12 : an electrode providing the current to the conductive liquid; and
- 14: two terminals outputting a sensed signal by a current applied to the electrode 12 through the current path made by the conductive liquid 11.

Since the two terminals 14 are entirely coated with an insulating material 13 except for exposed portions at the ends of the terminals, the current (due to electric potential Vcc applied to the electrode 12 (not shown in FIGS. 3A–6 for clarity) is outputted through protruding output ports 15 in case one or both ends of the terminals which are not covered with the insulating material are soaked by the conductive liquid 11 for making the current path.

The following description is about the operation of a tilt sensor according to the preferred embodiment of the present invention.

FIGS. 1B and 1C show a position of the bubble 10 in the tilt sensor in response to the tilting direction thereof. FIG. 1B shows the position of the bubble 10 in a case where the tilt sensor tilts to the left, and FIG. 1C shows the position of the bubble in a case where the tilt sensor tilts to the right.

Since the bubble 10 in the tilt sensor moves to the right side when the tilt sensor tilts to the left and a tilting degree is over a predetermined size as shown in FIG. 1B, the current applied to the electrode 12 is outputted through the left terminal 14 of which the end is soaked by the conductive liquid 11, via the current path made by the conductive liquid.

Since the bubble 10 is positioned in the middle of the surface of the liquid when the tilt sensor is in a horizontal state as shown in FIG. 1A, the ends of the left and right terminals 14 which are not covered with the insulating material are separated from the conductive liquid 11 and the current outputted from the left and the right terminals 14 is zero.

Since the bubble 10 in the tilt sensor moves to the left side when the tilt sensor tilts to the right and a tilting degree is over a predetermined size as shown in FIG. 1C, the current applied to the electrode is outputted through the right terminal 14 of which the end is soaked by the conductive liquid 11, via the current path made by the conductive liquid 11.

Accordingly, the present invention provides a tilt sensor having a high sensitivity, which senses a tilting direction of the tilt sensor 1 by moving the bubble 10 according to the tilting direction of the tilt sensor, separating the corresponding terminal 14 from the current path, that is, the conductive liquid, and determining the current outputted through the corresponding terminal to be zero.

FIGS. 2 through 6 are front views and elevational views of the tilt sensor according to the first to fifth preferred embodiment of the present invention.

Figure 3A:
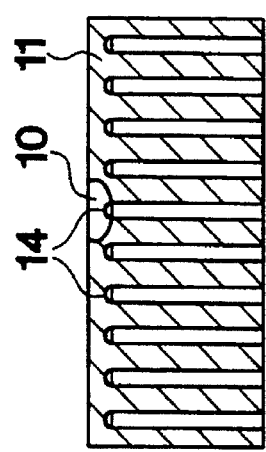
FIG. 3A shows a front view taken along line III—III and FIG. 3B shows an elevational view of the tilt sensor according to a second preferred embodiment of the present invention.
Figure 3B:
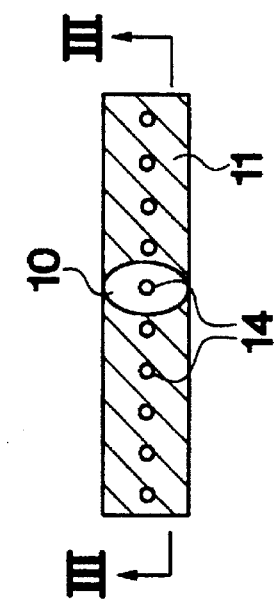

FIG. 2A shows a front view and FIG. 2B shows an elevational view of the tilt sensor according to a first preferred embodiment of the present invention and FIG. 3A shows a front view and FIG. 3B shows an elevational view of the tilt sensor enhancing the sensing precision by mounting a plurality of terminals 14 lengthwise in the container according to a second preferred embodiment of the present invention.

Figure 4A:
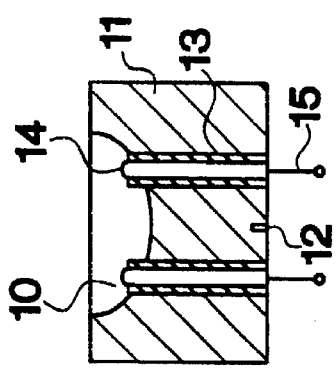
FIG. 4A shows a front view taken along line IV—IV and FIG. 4B shows an elevational view of the tilt sensor according to a third preferred embodiment of the present invention.
Figure 4B:
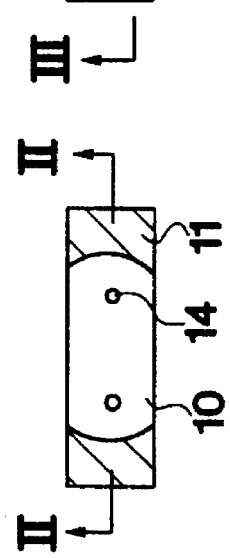

FIG. 4 shows a front view and FIG. 4B shows an elevational view of the tilt sensor 1 of which the container is hemispheric and the terminals 14 are mounted to radiate in all directions along the curved surface of the upper part of the container, according to the third preferred embodiment of the present invention.

According to the third preferred embodiment of the present invention, a tilting degree of a position corresponding to a coordinate can be sensed.

Referring to the terminals, it is possible to mount the stick-shaped terminals 14 on the bottom of the container as in the first and third preferred embodiments of the present invention or along the small projection on the inner surface of the upper part of the container where the bubble moves as the fourth and fifth preferred embodiment of the present invention.

Figure 5:
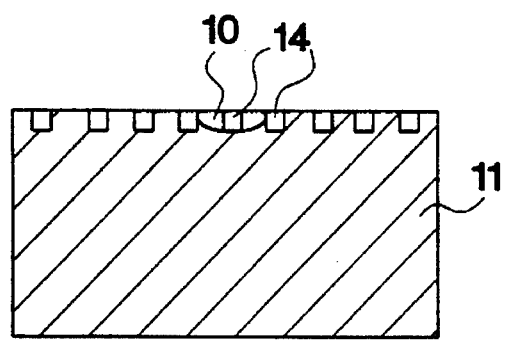
FIG. 5 depicts a front elevational view of the tilt sensor according to a fourth preferred embodiment of the present invention.
Figure 6:
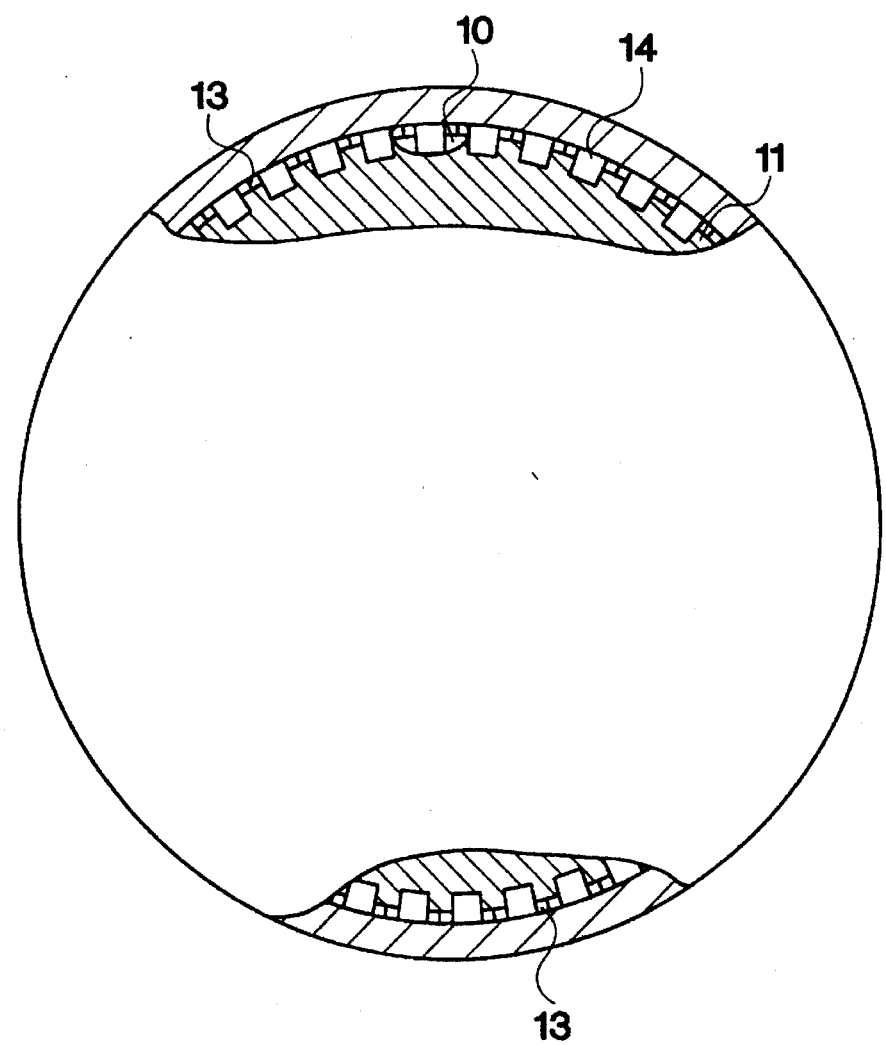
FIG. 6 depicts a front elevational view of the tilt sensor according to a fifth preferred embodiment of the present invention.

FIGS. 5 and 6 show the tilt sensor according to the fourth and fifth preferred embodiment of the present invention. Particularly, FIG. 6 shows a tilt sensor according to the fifth preferred embodiment of the present invention, of which the container is spherical and the terminals 14 are mounted along the inner circumferential surface of the container, thereby having a large tilt-sensible range and a high sensibility.

What is claimed is:

1. A tilt sensor, comprising:

a container of a predetermined dimension;

a conductive liquid provided in said container, said conductive liquid including a nonconductive bubble on the surface thereof;

an electrode mounted on an inner surface of and projecting to an interior of said container for providing an electric potential to said conductive liquid in said container;

a plurality of terminals mounted on the inner surface of said container and having respective exposed portions spaced from said electrode, each of said plurality of terminals whose exposed portion contacts said conductive liquid outputting a current due to the electric potential provided from said electrode to said conductive liquid, thereby outputting a tilt sensing signal; and an insulating material coating each of said plurality of terminals except the respective exposed portions such that only the exposed portions may contact said conductive liquid.

2. The tilt sensor according to claim 1, wherein the inner surface of said container includes a planar surface, said plurality of terminals having their respective exposed portions located equidistant from the planar surface of said container.

3. The tilt sensor according to claim 1, wherein the inner surface of said container includes a hemispherical surface, and said plurality of terminals are mounted to extend toward the hemispherical surface and to leave a predetermined space between the hemispherical surface and said terminals.

4. The tilt sensor according to claim 1, wherein the inner surface of said container includes a spherical surface, and said plurality of terminals are mounted along the spherical surface of said container.

5. The tilt sensor according to claim 1, wherein the inner surface includes opposing first and second surfaces, said terminals protruding from the first surface toward the second surface and being coated with said insulating material except the end which is proximal to the second surface.

6. The tilt sensor according to claim 1, wherein the inner surface includes an upper part of the container there, in use, the bubble is ordinarily located, and said plurality of terminals protrude from the upper part of the container.

7. The tilt sensor according to claim 1, wherein each of said terminals is a stick-shaped terminal extending from the inner surface of said container, the respective exposed portions being distal ends of the stick-shaped terminals.

8. The tilt sensor according to claim 1, wherein the inner surface of said container includes a curved surface, the respective exposed portions of said terminals being located equidistant from the curved surface.

9. The tilt sensor according to claim 8, wherein the curved surface includes a hemispherical surface, the respective exposed portions of said terminals being located equidistant from the hemispherical surface.

10. The tilt sensor according to claim 9, wherein the exposed portions are arranged in two dimensions.

11. The tilt sensor according to claim 8, wherein the curved surface of said container includes a spherical surface, the respective exposed portions of said terminals being located equidistant from the spherical surface.

12. The tilt sensor according to claim 11, wherein the exposed portions are arranged in two dimensions.

13. A tilt sensor, comprising:

a container;

a conductive liquid provided in said container, said conductive liquid including a nonconductive bubble;

an electrode projecting into an interior of said container, for providing an electric potential to said conductive liquid in said container;

a plurality of terminals extending into the interior of said container and spaced from said electrode, each terminal including an exposed portion located in the interior of said container; and an insulating material coating each of said terminals except the respective exposed portions, wherein a current is output by each terminal whose exposed portion contacts said conductive liquid, the current being due to the electric potential from said electrode.

14. The tilt sensor according to claim 13, wherein each of said terminals is a stick-shaped terminal extending from the inner surface of said container, the respective exposed portions being distal ends of the stick-shaped terminals.

15. The tilt sensor according to claim 13, wherein the inner surface of said container includes a curved surface, the respective exposed portions of said terminals being located equidistant from the curved surface.

16. The tilt sensor according to claim 13, wherein the exposed portions are arranged in one dimension.

17. The tilt sensor according to claim 13, wherein the exposed portions are arranged in two dimensions.

18. The tilt sensor according to claim 17, wherein the exposed portions lie in different planes.

* * * * *